United States Patent

[11] 3,595,107

[72] Inventor Stephen Dackow
 808 E. Ocean Front, Balboa, Calif. 92661
[21] Appl. No. 870,583
[22] Filed Nov. 5, 1969
[45] Patented July 27, 1971

[54] PLASTIC PIPE TAPERING DEVICE
 10 Claims, 8 Drawing Figs.
[52] U.S. Cl. ................................................... 82/4 C,
 77/73
[51] Int. Cl. ................................................... B23b 5/16
[50] Field of Search ........................................... 82/4.8 C;
 77/73

[56] References Cited
 UNITED STATES PATENTS
 1,572,924 2/1926 Hand et al. .................. 82/4 C
 2,470,392 5/1949 Gassmann .................... 77/73
 3,167,982 2/1965 Sherwood..................... 82/4 C Primary Examiner—Leonidas Vlachos
Attorney—William C. Babcock ABSTRACT: A rotary tool for concurrently forming a circumferential taper of desired angulation on an end portion of a length of plastic pipe and facing the end extremity of said portion to be normal to the longitudinal axis of the pipe.

PATENTED JUL 27 1971 3,595,107
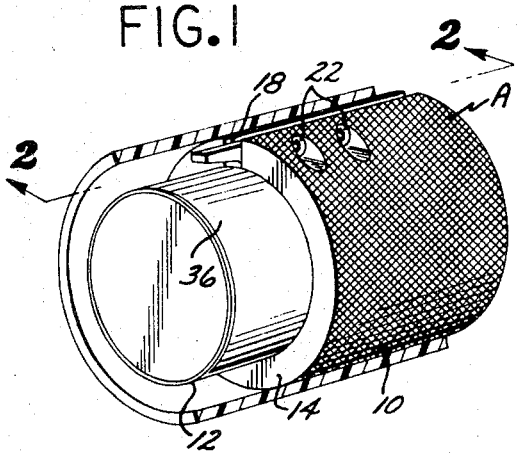
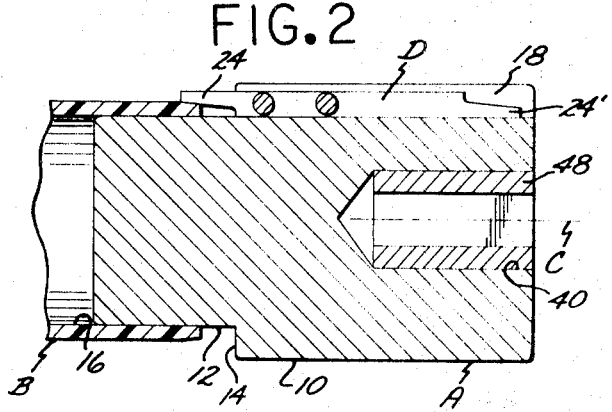
INVENTOR.
STEPHEN DACKOW
BY
William C. Babcock
ATTORNEY

3,595,107

1

PLASTIC PIPE TAPERING DEVICE

BACKGROUND OF THE INVENTION

1. Field of the Invention

A rotary tool for concurrently tapering and facing the end portions of plastic pipe.

2. Description of the Prior Art

Plastic pipe formed from a material such as unplasticized polyvinyl chloride has recently been introduced in which lengths of the pipe are joined together end to end by slip fits. In joining such pipe together, an end portion of a first length thereof is longitudinally forced into the bulged end portion of a second length thereof to sealingly engage a resilient ring contained therein. Each length of pipe as furnished by a manufacturer has a taper formed on a first end thereof to effect initial slidable engagement with the sealing ring contained in the bulged end of a second length of the pipe. However, when such pipe is being installed a length thereof must occasionally be cut to effect a connection, with the taper formed on the length of pipe by the manufacturer being removed therefrom.

Until the development of the present invention, no simple easily used tool has been available to taper and face a cut end portion of plastic pipe. The present invention provides a tool to taper and face a cut end portion of plastic pipe to permit the cut end portion to be slidably and sealingly engaged by a sealing ring in the bulged end portion of a second length of the pipe.

SUMMARY OF THE INVENTION

A tool that includes a rigid body that may be either hand or power rotated, with the body supporting a cylindrical mandrel that slidably and rotatably engages the interior of an end portion of plastic pipe, and a cutter bar removably mounted in a longitudinal position on the body and extending over the mandrel. When the body, mandrel and cutter bar are concurrently rotated in engagement with an end portion of plastic pipe, the end portion is concurrently faced and has a circumferential taper of desired angulation formed thereon.

BRIEF DESCRIPTION OF THE DRAWINGS

FIG. 1 is a perspective view of the tool for concurrently facing and tapering an end portion of plastic pipe;

FIG. 2 is a longitudinal cross-sectional view of the tool taken on the line 2—2 thereof in initial engagement with an end portion of a length of plastic pipe;

FIG. 3 is the same cross-sectional view as shown in FIG. 2 but after the end portion of pipe has been tapered and faced;

FIG. 4 is a front elevational view of the tool;

FIG. 5 is a transverse cross-sectional view of the tool;

FIG. 6 is an enlarged side elevational view of a portion of the cutter bar in engagement with an end portion of plastic pipe, and after the latter has been tapered and faced;

FIG. 7 is a transverse cross-sectional view of the cutter bar taken on the line 7—7 thereof in Figure 6; and FIG. 8 is a perspective view of the tool mounted on a power-actuated unit.

DESCRIPTION OF THE PREFERRED EMBODIMENTS

A tool A for forming a taper on a cut end portion of plastic pipe B is shown in FIG. 1. The tool A concurrently with forming a taper on the pipe B also faces the end of the pipe adjacent to the taper to be normal to the longitudinal axis C of the pipe.

Tool A includes a rigid cylindrical body 10 that has a diameter substantially greater than the external cross-sectional diameter of the pipe B that is to have a taper formed on an end portion thereof. A cylindrical mandrel 12 projects forwarding from a first end of body 10 and is longitudinally aligned therewith. Body 10 and mandrel 12 cooperate at their junction to define an annulus shaped body shoulder 14. The mandrel 12 is of such cross section as to slidably and rotatably engage the interior surface 16 of the pipe B.

2

A longitudinal slot 18 of square or rectangular cross section is formed in body 10 and extends the length thereof. Slot 18 is removably engaged by a cutter bar D. A number of longitudinally spaced transverse tapped bores 20 are formed in body 10, and are in communication with slot 18. The tapped bores 20 are engaged by screws 22. Screws 22 when tightened bear against cutter bar D, and serve to removably hold the cutter bar in a desired longitudinal position in slot 18.

Cutter bar D on a first end portion 24 thereof has first and second longitudinally extending faces 26 and 28 that intersect to define first and second cutting edges 30 and 32 that are preferably connected by a third curved cutting edge 34 as shown in Figure 6. First and second faces 26 and 28 as may best be seen in FIG. 7 sustain an angle of less than 90° therebetween.

The forward extremity 30a of edge 30 is spaced outwardly from the external surface 36 of mandrel 12 a distance greater than the thickness of the wall of pipe B that is to have a taper formed on an end portion thereof. Such spacing is required to permit easy initial entry of an end portion of the pipe B into the space defined between the cutting edge 30 and mandrel surface 36.

The cutter bar D is held in slot 18 by screws 22 in such a position that second cutting edge 32 is slightly forwardly disposed from body shoulder 14. If the tool A is to be hand rotated to form a taper on an end portion of pipe B, the external surface of body 10 preferably has knurls 38 formed thereon. The knurls 38 tend to prevent rotational slippage of the body 10 relative to the hand of the user (not shown) that grips the body.

Body 10 may have an elongate recess 40 that extends inwardly from a second end 42 thereof to permit the body to be rotated by an engaging power driven member 44 of an electric drill 46. A sleeve of hard metal 48 is disposed in recess 40, if the body 10 is formed from a lightweight relatively soft metal such as aluminum or the like. The recess engaged by the member 44 is preferably of noncircular transverse cross section. Tool A may also be gripped in a chuck 50 and rotated by an electric motor 52 as shown in Figure 8.

Irrespective of how the tool A is rotated, the method of forming a taper 54 and faced edge 56 on an end portion of the pipe B is the same. An end portion of the pipe B is caused to slidably engage mandrel 12, with the tool A thereafter rotated. The rotating first cutting edge 30 forms the taper 56 on the pipe B as the pipe is advanced towards the tool. As the forming of the taper 56 is being completed the rotating second cutting edge 32 forms the faced edge 54 on the end portion of the pipe. The third cutting edge 34 forms a curved surface 54 on the pipe that smoothly connects the taper 50 to the faced edge 52.

Cutter bar D is preferably formed with a second end portion 24' that is identical with first portion 24, to permit the second portion 24' to be used after the first portion 24 becomes dull from use. Second portion 24' is used for forming a taper and facing the end of a length of plastic pipe, by reversing the position of the cutter bar D in slot 18. To protect the projecting forward portion 24 from damage by inadvertent contact with a hard object, a protective cylindrical shell 58 may be frictionally mounted on the external surface of body 10 and extend forwardly therefrom over mandrel 12.

I claim:

1. A device for use in concurrently forming a cylindrical tapered surface on an end portion of a plastic pipe and facing said end portion to have a circumferential end extremity that is normal to the longitudinal axis of said pipe, said device including:

a. an assembly that includes a rotatable elongate body that has a longitudinal slot that extends the length thereof, said body having a transverse diameter substantially greater than the external diameter of said pipe, and a longitudinally aligned cylindrical mandrel that extends forwardly from a first end of said body, said mandrel and body at their junction defining a circumferentially extending body shoulder, and said mandrel of such transverse cross section as to slidably and rotatably engage said pipe when said body is rotated relative to said pipe;

b. a cutter bar removably positioned in said slot with a first end portion of said bar projecting forwardly from said body and spaced from said mandrel, said first end portion defining first and second cutting edges, said first cutting edge extending longitudinally on said first portion, said first cutting edge having the forward extremity thereof spaced outwardly from said mandrel a distance greater than the maximum wall thickness of pipe on which said device will be used, said first cutting edge tapering inwardly towards said mandrel at an angle at which it is desired to form said tapered surface. Said first cutting edge on the rearward end thereof developing into said second cutting edge; and c. first means for removably holding said cutter bar in said slot with said second cutting edge disposed slightly forwardly from said body shoulder, and said assembly and cutter bar when rotated concurrently relative to said end portion of said pipe and moved longitudinally relative thereto forming said tapered surface and end extremity by said first and second cutting edges being in pressure cutting contact with said end portion.

2. A device as defined in claim 1 in which said first cutting edge is defined by first and second longitudinal intersecting surfaces on said first end portion, said first and second surfaces sustaining an angle of less than 90° therebetween, with said first surface radially aligned relative to said mandrel, and said second surface sloping upwardly and away from said mandrel.

3. A device as defined in claim 1 in which said slot and cutter bar are of rectangular transverse cross sections, and said first means are a plurality of screws that engage tapped bores formed in said body that communicate with said slot, with said screws when tightened in said bores pressure contacting said cutter bar and frictionally holding said cutter bar in said slot.

4. A device as defined in claim 1 which, in addition, includes:

second engageable means on a second end of said body for concurrently rotating said body mandrel and cutter bar when said second engageable means are engaged by a power driven rotatable engaging member.

5. A device as defined in claim 4 in which said second means is a longitudinally centered recess of noncircular transverse cross section that extends into said body from said second end thereof.

6. A device as defined in claim 1 in which said cutter bar includes a second end portion identical to said first end portion, and said second end portion capable of being used to form said tapered surface and end extremity on said pipe when said cutter bar is so disposed in said slot that said second portion extends forwardly over said mandrel.

7. A device as defined in claim 1 in which at least a portion of said second edge is substantially normal to said mandrel.

8. A device as defined in claim 7 in which said first and second edges merge into a curved third cutting edge formed in said cutter bar and situated between said first and second edges.

9. A device as defined in claim 1 in which said body is formed with a knurled exterior surface that may be grasped manually to facilitate the rotation of said body, mandrel and cutter bar relative to said pipe.

10. A device as defined in claim 1 which in addition includes:

d. a cylindrical shell that frictionally engages the exterior surface of said body and extends over said first end portion of said cutter bar to prevent damage to said cutter bar by inadvertent contact with a hard object.